(12) United States Patent
Dunstan et al.

(10) Patent No.: US 7,830,942 B2
(45) Date of Patent: Nov. 9, 2010

(54) ULTRAVIOLET LASER LIGHT SOURCE PULSE ENERGY CONTROL SYSTEM

(75) Inventors: Wayne J. Dunstan, San Diego, CA (US); Robert N. Jacques, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 435 days.

(21) Appl. No.: 11/900,527

(22) Filed: Sep. 11, 2007

(65) Prior Publication Data

US 2009/0067457 A1    Mar. 12, 2009

(51) Int. Cl.
*H01S 3/22* (2006.01)
*H01S 3/223* (2006.01)

(52) U.S. Cl. .................... 372/55; 372/25; 372/29.015; 372/29.01; 372/57

(58) Field of Classification Search .................. 372/25, 372/29.011, 38.01, 29.01, 55, 68
See application file for complete search history.

(56) References Cited

U.S. PATENT DOCUMENTS

| | | | |
|---|---|---|---|
| 6,005,879 A | 12/1999 | Sandstrom et al. ............ 372/25 |
| 6,690,704 B2 * | 2/2004 | Fallon et al. .................. 372/58 |
| 7,039,086 B2 | 5/2006 | Fallon et al. .................. 372/55 |
| 2006/0146900 A1 | 7/2006 | Jacques et al. ............. 372/38.1 |
| 2006/0251135 A1 | 11/2006 | Ershov et al. ................. 372/25 |
| 2007/0195836 A1 | 8/2007 | Dunstan et al. ............... 372/32 |

\* cited by examiner

*Primary Examiner*—Minsun Harvey
*Assistant Examiner*—Delma R Forde

(57) ABSTRACT

A method and apparatus is disclosed which may comprise: a gas discharge laser system energy controller which may comprise: a laser system energy controller providing a first laser operating parameter control signal based on an error signal related to a value of the output energy of the laser system compared to a target value for output energy and an energy controller model of the value of the first laser operating parameter necessary to change the value of the laser system output energy to the target value; a first laser system operating parameter control signal modifier providing a modification to the first laser system operating parameter control signal based upon a controller signal modification model of the impact of a second laser system operating parameter on the value of the first laser system operating parameter necessary to change the value of the output energy to the target value.

20 Claims, 7 Drawing Sheets

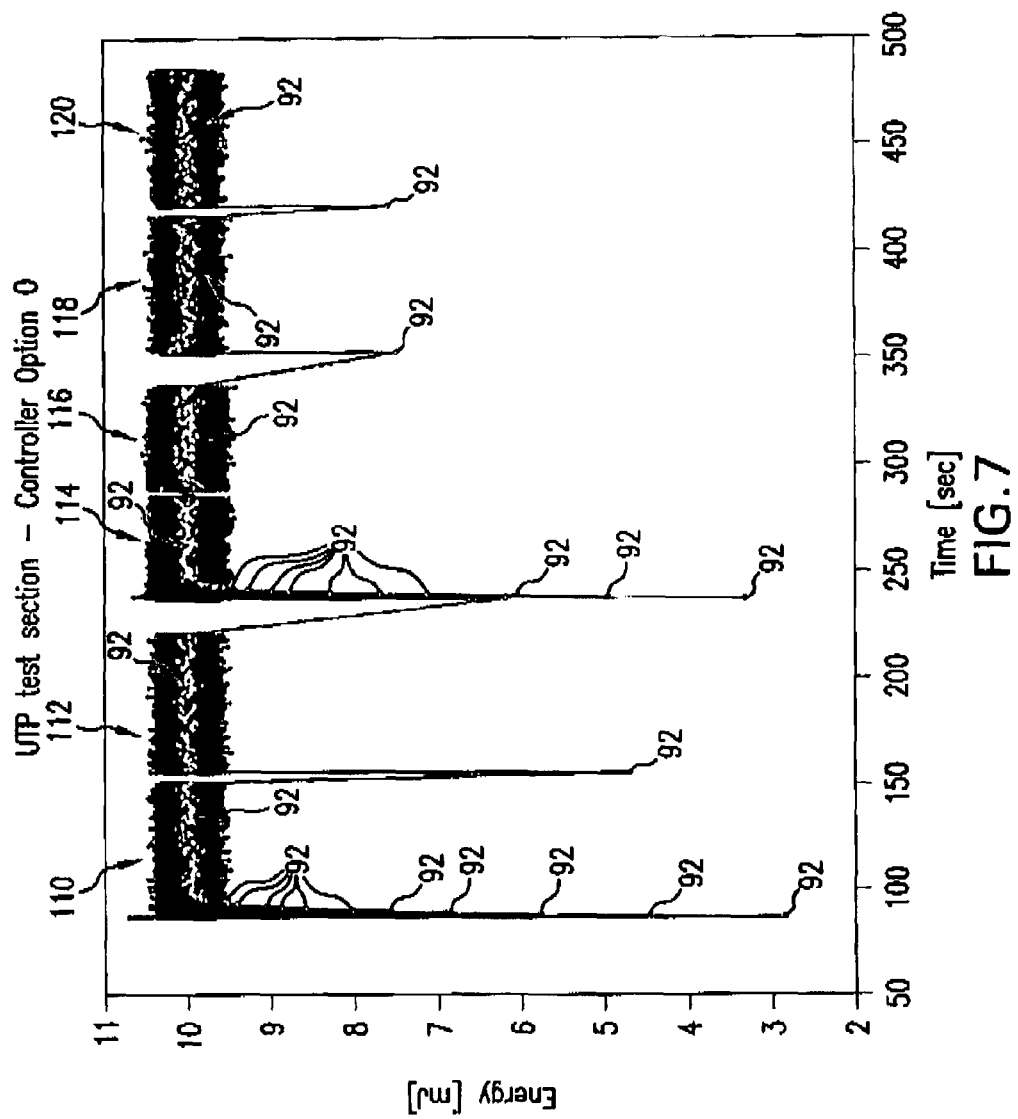

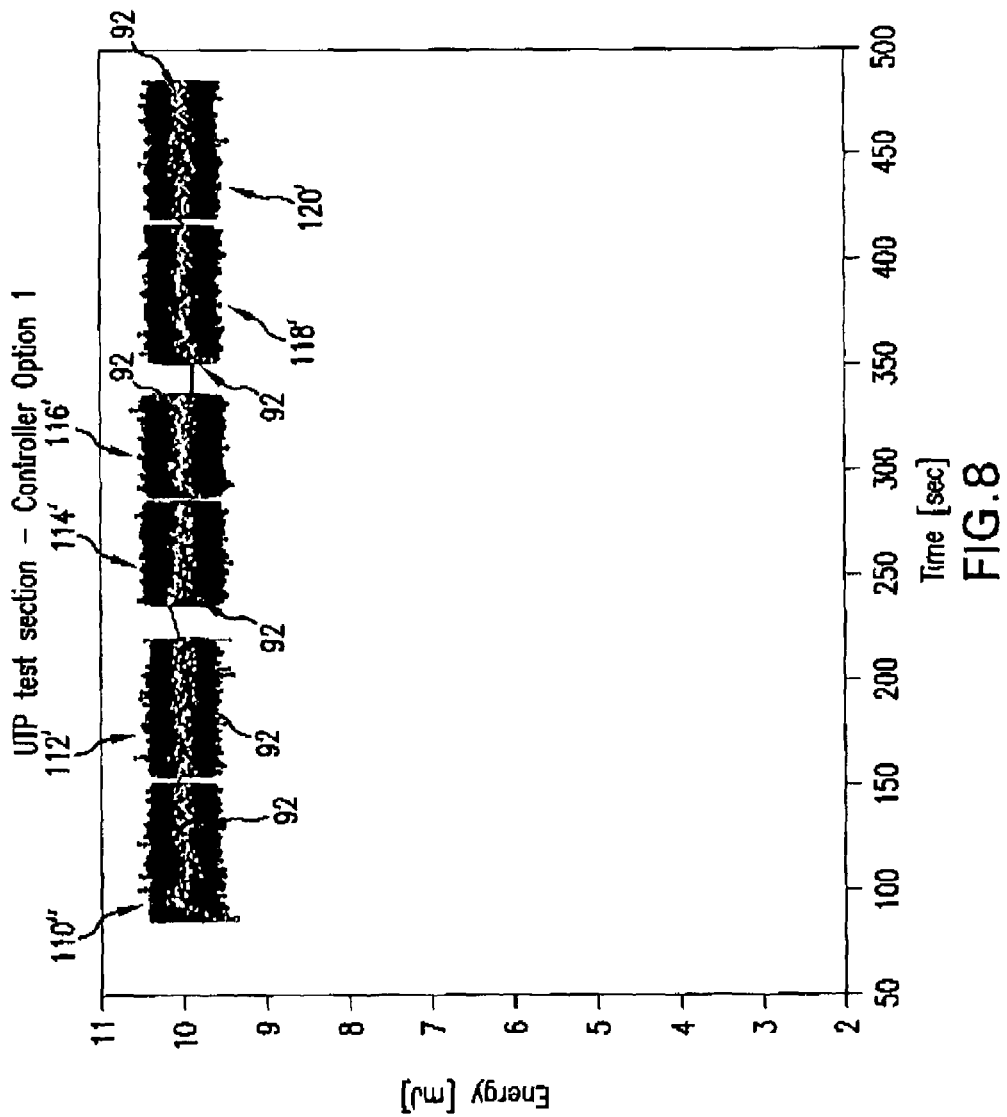

ULTRAVIOLET LASER LIGHT SOURCE PULSE ENERGY CONTROL SYSTEM

CROSS-REFERENCE TO RELATED APPLICATIONS

The present application is related to U.S. patent application Ser. No. 11/482,339, filed on Jul. 6, 2006, published on Nov. 9, 2006, Pub. No. 20060251135, entitled TIMING CONTROL FOR TWO CHAMBER GAS DISCHARGE LASER SYSTEM; and also related to U.S. patent application Ser. No. 11/323,604, filed on Dec. 29, 2006, published on Aug. 6, 2006, Publication No. 20060146900, entitled MULTI-CHAMBER GAS DISCHARGE LASER BANDWIDTH CONTROL THROUGH DISCHARGE TIMING, the disclosures of which are hereby incorporated by reference.

FIELD

The disclosed subject matter relates to ultraviolet laser light sources, e.g., semiconductor manufacturing lithography laser light sources, elongated thin beam thin film panel treatment (amorphous silicon annealing for form elongated polysilicon crystals) and extreme ultraviolet plasma formation drive lasers, and the like, and particularly to pulse energy and dose control for such systems.

BACKGROUND

The present invention related to ultraviolet laser light sources, e.g., semiconductor manufacturing lithography laser light sources, elongated thin beam thin film panel treatment (amorphous silicon annealing for form elongated polysilicon crystals) and extreme ultraviolet plasma formation drive lasers, and the like, and particularly to pulse energy and dose control for such systems.

An exemplary energy controller aims to keep the measured laser system output pulse energy of each pulse or pulse energy averaged over a selected number of pulses, e.g., within a given burst, constant at the setpoint specified (e.g., at 10 mJ), though often the pulse energy can vary from the selected set point. In the case of energy control system such as have appeared in applicants' assignee's laser systems in the past, such as XLA series laser systems sold by Cymer, Inc. such energy control may have been achieved by calculating a voltage to command to the pulse power sub system that is computed from the energy errors from previous pulses (e.g., measured shutter energy at the laser system output shutter minus the energy setpoint). Such a system is illustrated in FIG. 1 and may contain a laser system 20 having a laser 22 which outputs a laser beam of pulses 24 each of which may have a measured energy, $E_{measured}$ and a controller 30, which may include a summer 32 for subtracting an energy setpoint, $E_{setpoint}$, from $E_{measured}$ to provide and Energy Error, $E_{error}$ to and energy controller servo 36, which may perform an algorithm to produce a voltage command signal $V_{command}$ to the laser 22, more specifically to a timing and energy controller for the laser or directly to a discharge voltage system, such as to the resonant charger. Alternatively, the servo 36 may be part of the timing and energy controller or the laser system and provide the $V_{command}$ signal to the solid state switched pulsed poser system (SSPPM) as are known in the art to control the voltage delivered between the electrodes in the laser for the next discharge produced laser pulse in the beam of laser pulses produced by the laser system 20. A trigger signal may be produced, e.g., either the laser timing and energy controller or some external source, e.g., a light source triggering controller on, e.g., an application system using the light, such as an integrated circuit photolithography system, e.g., a scanner, or a thin film transistor crystallization system or a laser produced plasma extreme ultraviolet light source plasma generation system. Discrete trigger signals may be received by the laser or desired time of firing signals may be received, which together with other prior trigger signals or desired time of firing signals may be used to define a trigger interval. Such trigger interval(s) may, however, vary from time to time or over time according to the timing of the trigger signals produced by the laser timing and energy control system or the external source.

The laser system 20 may be a discrete laser system (i.e., pulsed), which means pulses may be requested at varying intervals in various ways as just noted. The interval between the laser pulses is referred to herein as the "trigger interval". The laser efficiency can change significantly as the trigger interval is varied. FIG. 3 shows an example of the resulting energy when such a laser system 20 is pulsed in constant voltage (i.e. the energy controller disabled so that no effort is made to modify discharge voltage to maintain energy constant, or as nearly so as possible with current controllers) for 15 patterns 40 consisting of 50 bursts, with a 30 second pause between each pattern 40. The x-axis is in seconds. The duty cycle was increased from 5% on the first pattern 40 to 40% on the last pattern 40 in equal increments of 2.5% each time successively.

A slowly varying duty cycle based change in laser efficiency has been observed, as illustrated, and denoted by the offset line 42. This effect is slow enough (order of minutes) that an energy controller servo, e.g., servo 36 in FIG. 1 can effectively flatten this to a desired energy offset line, i.e., maintain a desired pulse energy setpoint.

Applicants provide an improved method and apparatus for maintaining this desired energy setpoint especially at the initiation of a burst.

SUMMARY

A method and apparatus is disclosed which may comprise: a gas discharge laser system energy controller which may comprise: a laser system energy controller providing a first laser operating parameter control signal based on an error signal related to a value of the output energy of the laser system compared to a target value for output energy and an energy controller model of the value of the first laser operating parameter necessary to change the value of the laser system output energy to the target value; a first laser system operating parameter control signal modifier providing a modification to the first laser system operating parameter control signal based upon a controller signal modification model of the impact of a second laser system operating parameter on the value of the first laser system operating parameter necessary to change the value of the output energy to the target value, producing a feed forward signal based on a history of the values of the second laser system operating parameter, as related to voltage to produce a selected output energy, for at least one prior burst. The first laser system operating parameter may comprise the discharge voltage across a pair of laser system electrodes and the second laser system operating parameter may comprise information relating to triggering the discharge between the electrodes, such as discharge trigger timing interval or duty cycle. The history of values may comprise values from a large number of prior bursts. The controller signal modification model may comprise an adaptive model or a non-adaptive model or a partly adaptive and partly non-adaptive model and may comprise a linear model, which may further comprise a model of a voltage correction having a linear dependence to duty cycle. A part of the utilization of the controller signal modification model may comprise utilizing a model of the modification having a linear dependence to duty cycle and may comprise computing duty cycle.

BRIEF DESCRIPTION OF THE DRAWINGS

FIG. 7 shows a graph illustrating aspects of the operation of a laser output pulse energy controller;

FIG. 8 shows a graph illustrating aspects of the operation of a laser output pulse energy controller according to aspects of an embodiment of the disclosed subject mater;

DETAILED DESCRIPTION OF PREFERRED EMBODIMENTS

Figure 1:
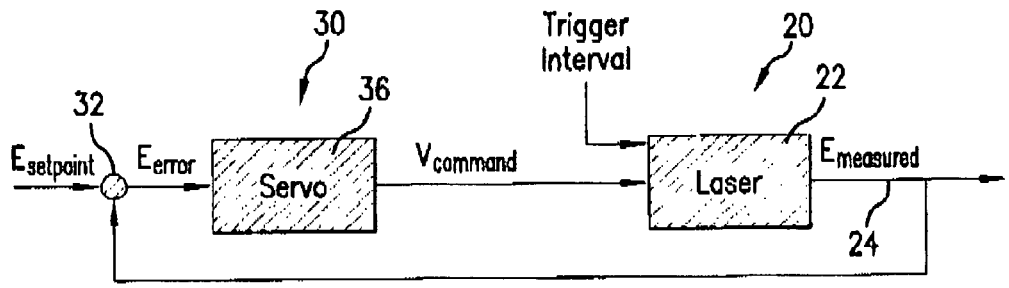
FIG. 1 shows a laser output pulse energy controller.
Figure 3:
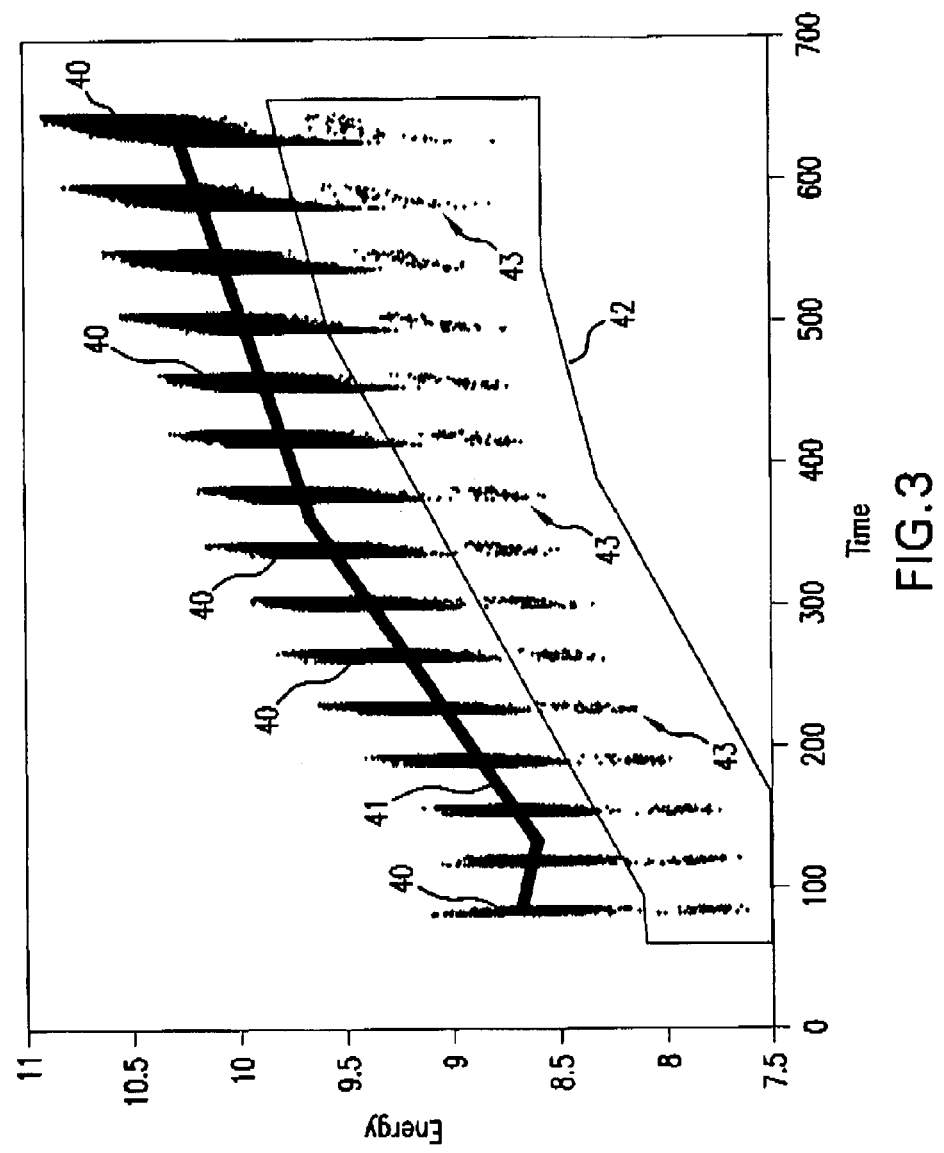
FIG. 3 shows a graph illustrating aspects of the operation of a laser output pulse energy controller.

According to aspects of an embodiment of the disclosed subject matter the first pulses of each burst which are the outlying dots 43 encased with the boundary line 42 shown in FIG. 3. The first pulses of a burst may be subject to transients, such as a short term duty cycle transient (e.g., on the order of a few seconds). Being the first pulse of a burst means a servo feedback loop such as shown in FIG. 1 may not be able to respond to mitigate the change in efficiency. Alternatively, one may compute a voltage based upon various different laser parameters, such as historical information relating to similar bursts with similar initiation parameter during the prior operation of the laser system 20. For example, in prior laser systems, applicants' assignee has used, e.g., a 3-bin controller that stored voltages to use on the first pulse of a burst based upon 3 different trigger intervals, using, e.g., a look up table, such as shown below in Table I. The definition of this Table I as shown below, had a voltage for pulse 1 as determined from one of three bins based upon the current trigger interval. Absolute voltage bins for short (ST), medium (MT) and long (LT) off times specify voltage for first pulse (V1). Short time (ST), Medium Time (MY) and Long Time (LT) could be defined as illustrated in Table I, relating to the trigger interval since the previous pulse.

TABLE I

| | Offset Voltage | | | | |
|---|---|---|---|---|---|
| Interval | pulse 1 | pulse 2 | pulse 3 | ... | pulse 20 |
| t < 0.35 s | ST_V1 | | | | |
| 0.35 < t < 4.5 s | MT_V1 | | | | |
| t > 4.5 s | LT_V1 | | | | |
| for all t | | V2 | V3 | ... | V20 |

Figure 4:
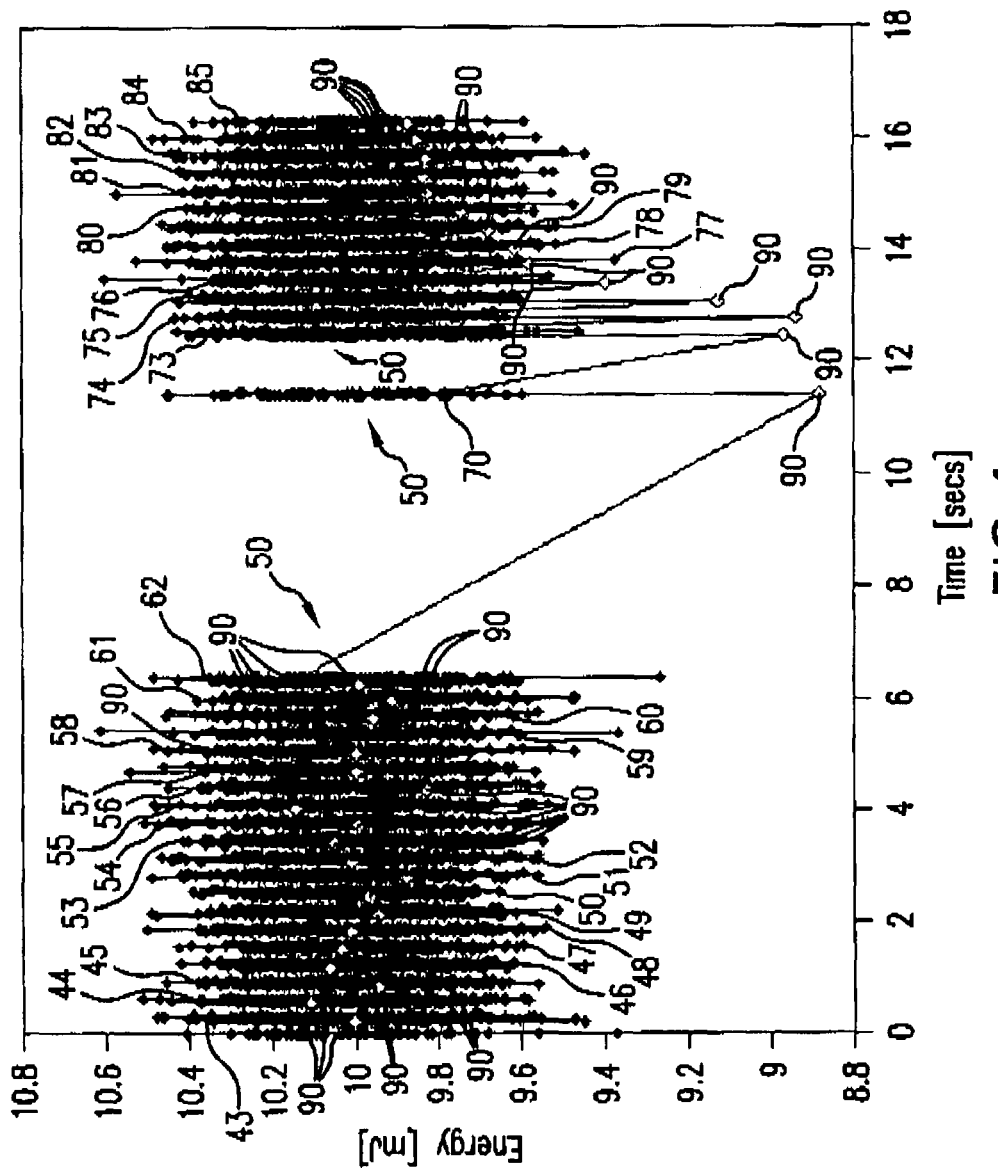
FIG. 4 shows a graph illustrating aspects of the operation of a laser output pulse energy controller.

However designing a feedforward scheme to use the trigger interval information presents problems that applicants have solved according to aspects of an embodiment of the disclosed subject matter. FIG. 4 shows an example of the prior 3 bin method with the closed loop energy controller running.

The vast majority of the dots 50 are measured energy of each pulse with a pre-defined firing pattern (or set of trigger intervals). From 0 to just above 6 seconds, as illustrated, the laser is shown to produce, e.g., 20 fixed length bursts 43-62 of 1200 pulses at 4 kHz. There is a 0.1 second pause between successive bursts 43-62. Then, as illustrated, a 5 second long pause occurred, followed by a burst 70, followed by a 1 second pause, followed by 13 bursts 73-85. The lighter dots 90 denote the first shot of each burst 52-65, 70 and 73-85.

Figure 5:
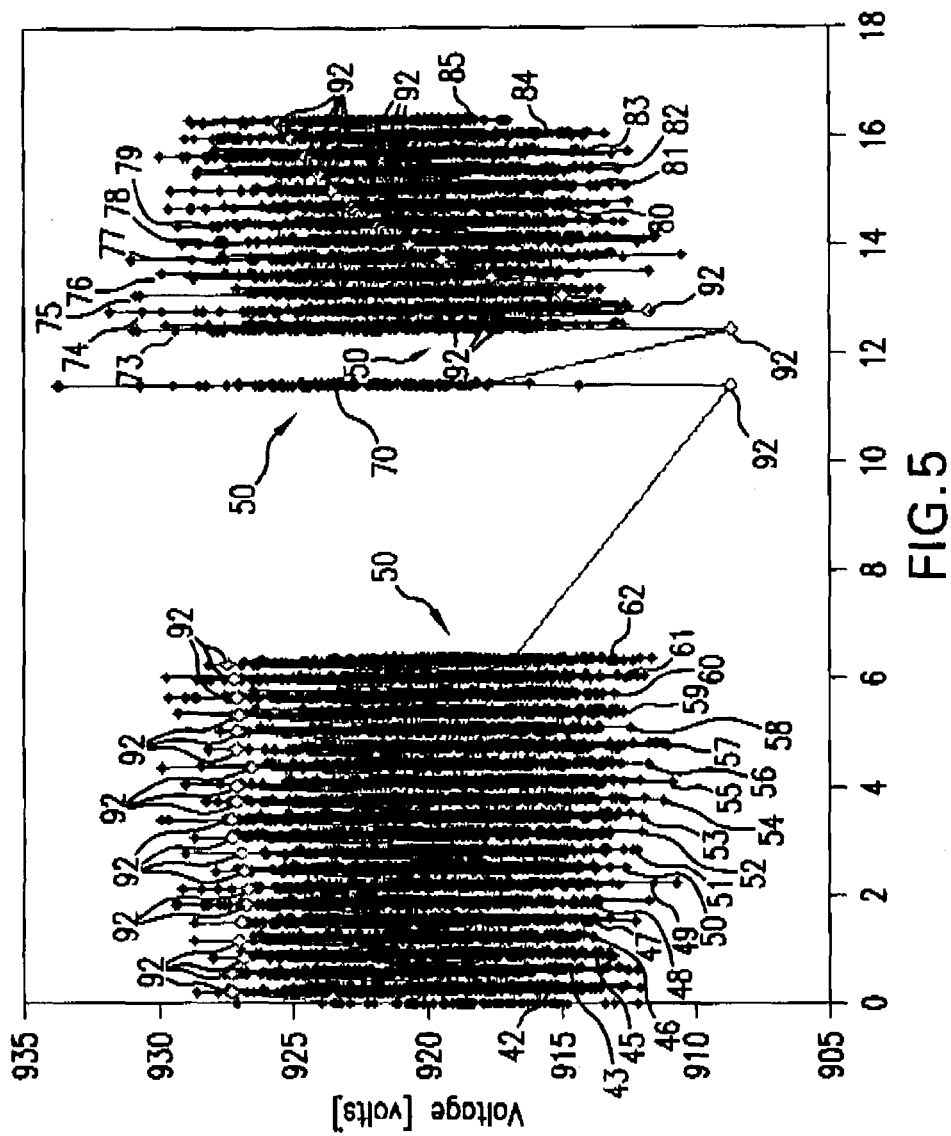
FIG. 5 shows a graph illustrating aspects of the operation of a laser output pulse energy controller.

Pulse energy on the first pulse, as illustrated, can sometimes be outside the normal distribution for the burst during this sequence. The corresponding voltage plot is shown in FIG. 5 by way of completing the illustration with the nominal voltage distribution for the same bursts of pulses 52-62, 70 and 73-85. This failure to keep the initial pulse always within the nominal distribution of voltage, and therefore the initial energy pulse 92 (shown in FIG. 5) for each burst, has been found to be the result of two problems identified using the above described method of feed forward.

First, after a long time off (e.g., >4.5 sec) the absolute voltage in the long-time-off bin is used for the first pulse voltage of the first burst that is fired next. This is okay. However, for the first pulse of the second burst, the trigger interval will typically be a very short time, and so the short time bin voltage is used. This tends to give an incorrect energy output, as it appears that the long time off effects take time to disappear, i.e. the laser controller has memory.

In addition the voltage bins can become "stale" (i.e. incorrect absolute voltage values stored in the bins) due to a lack of training (i.e. not recently having firing in the time ranges that required using the respective voltage bin). This problem has particularly been observed with modifications to test protocols implemented by applicants' assignee, which highlighted problems when there were large delays introduced between training particular bins.

FIG. 7 shows by way of illustration another example of these types of errors. for example, the pattern of bursts 110 may have initial pulse energies 92 having errors in desired energy (they are outside the variance of about ±0.5 mJ from the vast majority of pulses in the burst making up the pattern 110. This can be, e.g., due to the fact the initial pattern 110 is starting up the laser, after, e.g., an interval not covered by any of the above noted bins. It can be seen that the prior system could eventually recover and have initial pulses in the bursts (shown more darkly in the patter of bursts) within the acceptable range, for the pattern of bursts 110, as well as for the other patterns 112, 114, 116, 118 and 120, at least in part because the burst in the pattern are now within an interval where the respective bin had been updated much more recently. Similarly, as the laser controller fires the laser with trigger intervals as exemplified in FIG. 7 the initial error and number of initial burst having outlying initial pulses decreases as the laser experiences delays between patters that are the same or approximately the same, e.g., comparing pattern 110 to 114 and 116, and comparing pattern 112 to pattern 120.

Figure 2:
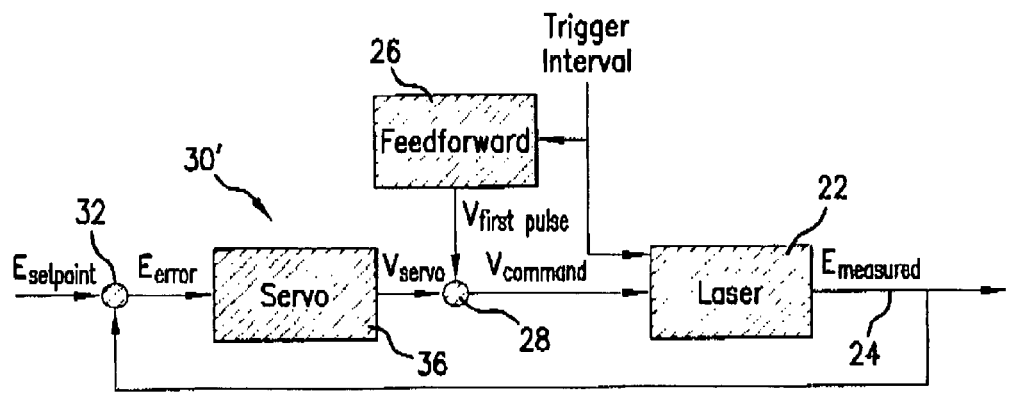
FIG. 2 shows schematically and in block diagram form a laser output pulse energy controller according to aspects of an embodiment of the disclosed subject matter.

According to aspects of the disclosed subject matter, applicants have introduced duty cycle feed forward to address this continuous (meaning) aspect of the problems. A Duty Cycle (DC) feed forward algorithm according to aspects of an embodiment of the disclosed subject matter can provide, as illustrated in FIG. 2, a controller 30' which replaces the present controller 30 of FIG. 1 performing the feed forward section of the energy algorithm for determining the first pulse voltage in a burst. According to aspects of an embodiment of the disclosed subject matter the controller 30 may utilize, instead of using three off-time bins as is currently the case, two estimators together, e.g., to predict a value of the first pulse voltage given the current trigger interval. The current algorithm for pulses 2 trough 20 can still remain as is. i.e., no change may be required.

The duty cycle ("DC") controller 30' may have for example certain inputs and outputs, such as the following inputs and outputs:

Inputs: Trigger Interval (for next pulse), e.g., a history for all pulses up to the upcoming pulse which is also used to control the laser 22 in laser system 20, as before;

Energy error and dEdV estimate (e.g., as provided by the controller 30 and servo 36 of FIG. 1, for pulse 1 in a previous burst or the previous burst), e.g., a history for the first pulse of each burst up to the last burst;

Outputs: Voltage Command (e.g., for pulse 1 for the upcoming burst), used to control the voltage and thus pulse energy for the first pulse in the next burst.

Trigger interval may be provided from the user of the light, e.g., the scanner controller may signal the laser to provide pulses at a certain pulse repetition rate starting at a certain time and stopping for a certain time, which may define a duty cycle/trigger interval. Otherwise, by way of example the laser system controller may compute a duty cycle and/or a trigger interval from available laser firing information, including laser firing history and/or firing commands received from outside the laser controller, e.g., from the scanner. According to aspects of an embodiment of the present invention, using a duty cycle ("DC")-based controller can serve to suppress both undesirable behaviors identified above in regard to the current system operation, e.g., in the first instance, by using a duty cycle based approach and in the second instance by continually training (upgrading or adapting) the fit.

According to aspects of an embodiment of the disclosed subject matter a duty cycle filter may be employed, e.g., by first calculating the duty cycle as follows, e.g., as a function of trigger interval, with the following exemplary but not limited to functions:

$$DC(i+1)=DC(i)(e^{-TrigInt/\tau})+100(1-e^{-Tmin/\tau})$$

or $$DC(i+1)=DC(i)+(e^{Tmin/\tau}-1)*(e^{-TrigInt/\tau})$$

or $$DC(i+1)=(DC(i)+e^{-Tmin/\tau}-1)*e^{-TrigInt/\tau}$$

where DC is the duty cycle;
  i is the discrete time index;
  TrigInt is trigger interval, e.g., the time between the last firing of the laser (discharge between the electrodes) and the current firing, e.g., in a single chamber laser system or in one of the chambers, e.g., for a seed laser/amplifier laser system;
  $\tau$ is a duty cycle window size in seconds;
  $T_{min}$ is a minimum time to reference 100% duty cycle, e.g., for a 4 kHz laser system, 1/rep rate$_{max}$=1/4000 Hz=250 μsec.

The property of the laser system $\tau$ reflects a parameter that accounts for the laser taking some time to, e.g., converge, e.g., to a new voltage when the duty cycle goes from, e.g., 5% to 60%. In such a case such convergence may take some time, e.g., it may take several seconds for the duty cycle caused change to move sixty percent of the way to its convergence to the new voltage for a given constant energy output of the laser at the new duty cycle. The exponential terms reflect a fit of the convergence to roughly an exponential path to convergence. This path to convergence may be approximated by one or a combination of more than one, in this case two, exponential terms in the creation of a parameterized function (straight line) curve for first pulse voltages as a function of the then current duty cycle. The exponential terms in the equations for the convergence fit may be implements in software using look up tables for stored values.

Figure 6:
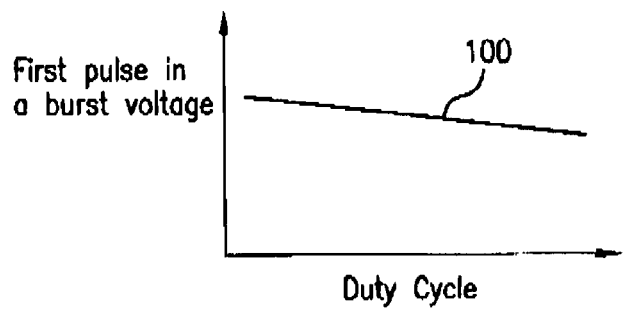
FIG. 6 shows a graph illustrating aspects of a model used for a laser output pulse energy controller according to aspects of an embodiment of the disclosed subject mater.

A least squares algorithm, of one of several varieties, e.g., a minimization of the normalized distances to the parameterized straight line function, may be used. This can provide a more or less straight line plot 100 as illustrated by way of example in FIG. 6. Such an exemplary parameterized equation may have the form of a slope and intercept equation, e.g.:

$$VFP=m*DC+c$$

where, VFP is the voltage of the first pulse
  DC is the duty cycle
  m is the slope of line
  c is the y-axis intercept The curve may also be fit with a recursive least squares formula also using a forgetting factor ($\lambda$). Such a recursive least squares criterion may be modified as follows according to aspects of an embodiment of the disclosed subject matter:

$$J(\theta, t) = \frac{1}{2}\sum_{k=1}^{t}\lambda^{t-k}(y((k)-\phi(k)^T\theta)^2$$

where 0<$\lambda$<1 is the forgetting factor.

The estimate may be calculated using the following equations:

$$\hat{\theta}(t)=\hat{\theta}(t-1)+K(t)\epsilon(t)$$

$$\epsilon(t)=y(t)-\phi(t)^T\hat{\theta}(t-1)$$

$$K(t)=P(t-1)\phi(t)[\lambda I+\phi(t)^TP(t-1)\phi(t)]^{-1}$$

$$P(t)=[I-K(t)\phi(t)^T]P(t-1)/\lambda$$

where:
  $\theta(t)$ is a curve parameter vector [2×1] equal to $$\begin{bmatrix} m \\ c \end{bmatrix};$$

with m equal slope and c equal intercept;

$K(t)$ is a gain vector [2×1];

$\epsilon(t)$ is the prediction error, of a size 1×1. It is equal to $\hat{y}(t+1)|_{y(t)}-y(t+1)$ or alternatively $\epsilon(t)=(\epsilon(t)-E_{target})/d\epsilon/dV$ y(t) is the output [1×1] which is equal to voltage for the first pulse ("VFP");

φ(t) is the regression vector [2×1], and is equal to $$\begin{bmatrix} DC \\ 1 \end{bmatrix};$$

P(t) is the covariance matrix [2×2] and is the covariance of the parameter estimate, which may reflect something akin to a signal to noise ratio for the estimate and actual VFP.

T constitutes a matrix transposition operator, e.g.

$$\begin{bmatrix} a \\ b \\ c \end{bmatrix}^T = \begin{bmatrix} a & b & c \end{bmatrix}.$$

And the memory of the estimator can be given by:

$$T_0 = \frac{2h}{1-\lambda}$$

where h is the sample rate.

According to aspects of an embodiment of the disclosed subject matter, in the most general sense applicants propose to calculate voltage based on some model of a feedforward based on trigger interval. For example:

$V_{feedforward} = f(\text{Trigger Interval})$

Such a model could be broken into a number of subset functional expressions such as:

$V_{feedforward} = f(DC)$ $DC = g(\text{Trigger Interval})$

The voltage for the feedforward portion of a burst can then be determined as a function of trigger interval. The model may, e.g., assume some repeatable relationship between trigger interval and voltage required to generate a constant energy. This may be determined using the same laser system, e.g., during initial pre-shipment testing, or for a series of lasers from empirical data from testing or numerous pre-shipment test of similar lasers in the laser series, but may also be updated (adapted) on a given laser.

The model/filter may be applied to trigger interval such that the signal generated by filtering the trigger interval (which applicants refer to as duty cycle) has an approximately linear relationship with voltage required to be applied to maintain constant energy. Such pre-filtering of the trigger interval signal could take a number of mathematical forms. It may include the current trigger interval value and any of a variety of, e.g., subsets of previous trigger interval values. It may be a partial set of non uniformly sampled previous trigger intervals.

This pre-filtering may be adaptive, that is it may change weighting or functional form based upon some laser related objective, e.g., maintaining bandwidth within some range, or performance metric, e.g., laser shots accumulated. This pre-filtering can to create a duty cycle signal that has some identifiable approximate functional relationship with voltage for a given desired output pulse energy. The pre-filtering could create a signal that has some identifiable functional relationship with one or more other laser signals e.g., bandwidth, chamber energy or wavelength.

The model being identified between the filtered duty cycle signal and the laser output pulse energy (through an appropriate $V_{command}$ signal being generated) may be static (fixed internal states) or dynamic (time varying internal states), e.g., $\alpha(n/t) = dx/dt + dx^2/dt$. The model may also be adaptive, whereby one or more of the coefficients, e.g., $\alpha(f(x)) + \beta(g(x))$ of a pre-defined model structure may be updated either continuously, e.g, by a lease mean squares algorithm or based upon some update initiation condition or some set of update conditions, e.g., a delta trigger interval greater than some threshold. The model structure can provide some functional dependence of V on the filtered trigger signal (duty cycle). The model may also be split into an Adaptive and Non-adapative parts. The model may be linear or non-linear, e.g., $f(x) = \alpha x$ or $f(x) = \alpha x^2$. The adaptive part of the model may use an objective function (such as Linear Least Squares) to adapt the model paramtetrization. The adaptive part of the model may be linear and the non-adaptive part non-linear.

The adaptation may be performed online, that is in real time onboard the laser, or off line, that is off the laser on some computing platform or by hand. The adaptation objective function may be, e.g., any form of the least squares algorithm, including, e.g., recursively using such as a Least Squares objective function to adapt the model.

There may be conditions programmed to trigger the engagement or disengagement of parts of the feedforward algorithm, the model and/or the filtering. For example, according to aspects of an embodiment of the disclosed subject matter if the duty cycle does not vary substantially, then the slope parameter identification section may be intentionally disabled for a time effectively locking the slope, and the system may then only update, e.g., the offset parameter, effectively allowing the linear function to float up and down with slowly varying laser efficiency changes. The adaptation algorithm may also incorporate a forgetting function that can, e.g., allow the algorithm to place more emphasis on new information and less emphasis or possibly no emphasis on older information. Alternatively the algorithm may not forget any of the information from previous inputs, e.g., trigger interval inputs.

According to Aspects of an embodiment of the disclosed subject matter, the following exemplifies software that may be used to implement portions of the disclosed subject matter. Initially the duty cycle may be set to zero and may be updated each laser shot according to the equations noted above as an example. The parameter function, e.g., a linear function may be calculated by establishing a slope and intercept, which may initially start with some stored value for each and then the slope and intercept may be calculated, e.g., as follows:

DCOffset and DCSlope may be computed according to the following: initialize the DC offset to an energy feed forward duty cycle offset initial value: EnergyFFDCOffsetInit, and initialize an Energy feed forward duty cycle slope to an initial value EnergyFFDCSlopeInit. Initialize the matrix, R[k], to $$\begin{bmatrix} r_{11} & 0 \\ 0 & r_{22} \end{bmatrix},$$

where $r_{11}$ is equal to a value for Energy feed forward duty cycle initial offset variance EnergyFFDCInitial OffsetVariance and $r_{22}$ is equal to a value for Energy feed forward duty cycle slope initial variance EnergyFFDCInitialSlopeVariance. Then, if the absolute value of the change in energy duty cycle, (DC[k]−DC[k−1]) is greater than some selected threshold, e.g., EnergyFFDutyCycleTolerance the following may be performed, e.g., implementing a filter:

$$R[k+1] = \lambda R[k] + \begin{bmatrix} 1 & DC[k] \\ DC[k] & DC^2[k] \end{bmatrix} + (1-\lambda)\begin{bmatrix} p_{offset} & 0 \\ 0 & p_{slope} \end{bmatrix}$$

$$\begin{bmatrix} \theta_{offset}[k+1] \\ \theta_{slope}[k+1] \end{bmatrix} = \begin{bmatrix} \theta_{offset}[k] \\ \theta_{slope}[k] \end{bmatrix} - R^{-1}[k+1]\begin{bmatrix} e[k] - \lambda p_{offset}\theta_{offset}[k] \\ e[k]DC[k] - \lambda p_{slope}\theta_{slope}[k] \end{bmatrix}$$

where $\lambda$ is the Energy feed forward forget factor, EnergyFFForgetFactor, e[k] is a feed forward error, FFerror, explained in more detail below, $p_{offset}$ is an energy feed forward offset penalty, EnergyFFOffsetpenalty, $p_{slope}$ is an Energy feed forward slope penalty, EnergyFFSlopePenalty, $\theta_{offset}$ is a DCOffset and $\theta_{slope}$ is a DCSlope.

If on the other hand, if the absolute value of (DC[k]−DC[k−1]) is less than the tolerance, EnergyFFDutyCycleTolerance, then the following can be implemented:

$$\theta_{offset}[k+1] = \theta_{offset}[k] - e[k]*g$$

where g is a gain factor, EnergyFFConstDCGain, and $\theta_{slope}$ is held constant.

The value of Energy feed forward, EnergyFeedForward, i.e., the voltage command signal may be computed as follows:

Then for the first shot of a burst, the feed forward value, $V_{command}$, can be set to an internal DC offset value, plus an internal DC slope value, DCSlopeInternal, times an energy duty cycle value, with the value hold Delta set to zero.

Figure 9:
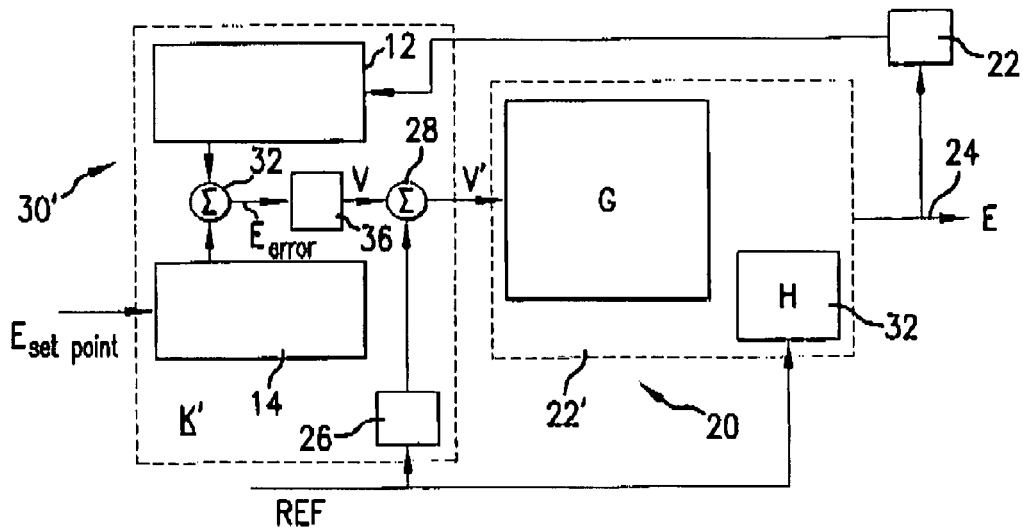
FIG. 9 shows schematically and in block diagram form a laser output pulse energy controller according to aspects of an embodiment of the disclosed subject mater.

Turning now to FIG. 9 there is shown an illustrative representation of a laser system 20 according to aspects of an embodiment of the disclosed subject matter. The laser system 20 may include a laser 22, which may have an operational function G, e.g., relating an input command such as a voltage command, $V_{command}$, illustrated as V' in FIG. 9 to a laser output parameter, such as output pulse energy, E, and also another operational function, H, which may relate another input, such as a referenced duty cycle to the output pulse energy E.

The system 30 may have a controller 30' which may comprise a controller function, K, which may relate, e.g., an Energy setpoint to an error setpoint error signal through a servo 14 and an output energy feedback to an energy feedback error signal through a servo 12, with a summer 32 summing the energy setpoint signal and the output energy feedback signal to provide an input $E_{error}$ for the voltage signal servo 36 to produce an energy error servo voltage signal output $V_{servo}$. The energy error servo voltage output signal $V_{servo}$ may be combined in a summer 28 with an Energy feed forward voltage signal $V_{firstpulse}$ to modify the signal $V_{servo}$, e.g., on the first pulse of each burst, to provide to the laser 22 with the final voltage command signal $V_{command}$ for any such pulse where the modification of $V_{servo}$ is utilized.

Figure 10:
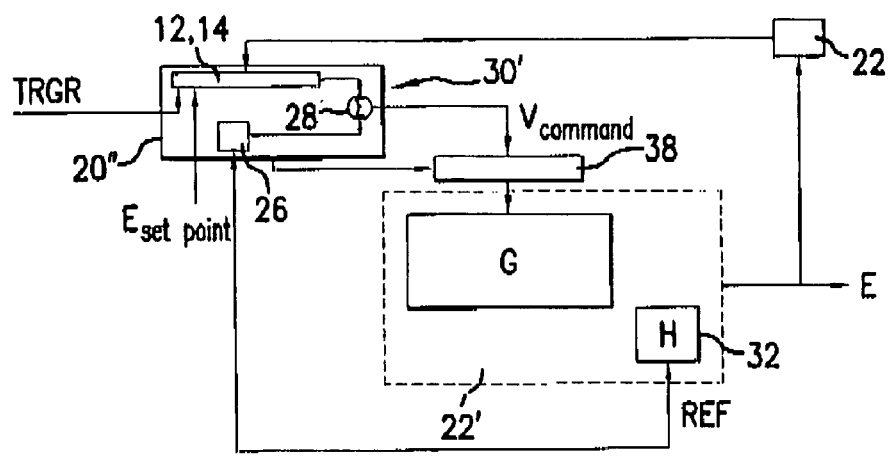
FIG. 10 shows schematically and in block diagram form a laser output pulse energy controller according to aspects of an embodiment of the disclosed subject mater.

FIG. 10 illustrates schematically and in block diagram form a system similar to that of FIG. 9, where the voltage command signal $V_{command}$, is utilized by a controller 30' to control the voltage delivered by a pulsed power module 38 to deliver the desired selected voltage to the electrodes (not shown) in the laser to maintain output energy E of the respective laser 22 output pulse 24.

It will be understood by those skilled in the art that a method and apparatus is disclosed in the present application which may comprise: a gas discharge laser system, such as an excimer or molecular fluorine laser system energy controller which may comprise: a laser system energy controller providing a first laser operating parameter, such as voltage, control signal such as $V_{servo}$ based on an error signal related to a value of the output energy of the laser system compared to a target value for output energy and an energy controller model of the value of the first laser operating parameter necessary to change the value of the laser system output energy to the target value, such as the energy error servo, and using, e.g., dE/dV; a first laser system operating parameter control signal modifier, such as feedforward 26, providing a modification to the first laser system operating parameter control signal based upon a controller signal modification model of the impact of a second laser system operating parameter, such as duty cycle, on the value of the first laser system operating parameter, i.e., voltage necessary to change the value of the output energy to the target value, producing a feed forward signal, such as $V_{command}$ based on a history of the values of the second laser system operating parameter, i.e., duty cycle as related to voltage to produce a selected output energy, for at least one prior burst. The first laser system operating parameter my comprise the discharge voltage across a pair of laser system electrodes and the second laser system operating parameter may comprise information relating to triggering the discharge between the electrodes, such as discharge trigger timing interval or duty cycle. The history of values may comprise values from a large number of prior bursts. The controller signal modification model may comprise an adaptive model or a non-adaptive model or a partly adaptive and partly non-adaptive model and may comprise a linear model, which may further comprise a model of a voltage correction having a linear dependence to duty cycle. A part of the utilization of the controller signal modification model may comprise utilizing a model of the modification having a linear dependence to duty cycle and may comprise computing duty cycle.

It will be understood by those skilled in the art that the aspects of embodiments of the disclosed subject matter are intended to be possible embodiments or portions of possible embodiments only and not to limit the disclosure of the disclosed subject matter in any way and particularly not to a specific possible embodiment or portion of a possible embodiment alone. Many changes and modification can be made to the disclosed aspects of embodiments of the disclosed subject matter that will be understood and appreciated by those skilled in the art. The appended claims are intended in scope and meaning to cover not only the disclosed aspects of embodiments of the disclosed subject matter but also such equivalents and other modifications and changes that would be or become apparent to those skilled in the art. In addition to changes and modifications to the disclosed and claimed aspects of embodiments of the disclosed subject matter others could be implemented.

While the particular aspects of the embodiment(s) of the ULTRAVIOLET LASER LIGHT SOURCE PULSE ENERGY CONTROL SYSTEM described and illustrated in this patent application in the detail required to satisfy 35 U.S.C. §112 are fully capable of attaining any above-described purposes for, problems to be solved by, or any other reasons for or objects of the aspects of an embodiment(s) above described, it is to be understood by those skilled in the art that presently described aspects of the described embodiment(s) of the disclosed subject matter are merely exemplary, illustrative and representative of the subject matter which is broadly contemplated by the disclosed subject matter. The scope of the presently described and claimed aspects of embodiments or portions of embodiments fully encompasses other embodiments or portions of embodiments which may now be or may become obvious to those skilled in the art based on the teachings of the Specification. The scope of the present ULTRAVIOLET LASER LIGHT SOURCE PULSE ENERGY CONTROL SYSTEM is solely and completely limited by only the appended claims and nothing beyond the recitations of the appended claims. Reference to an element in any such claim in the singular is not intended to mean nor shall it mean in interpreting such claim element "one and only one" unless explicitly so stated, but rather "one or more". All structural and functional equivalents to any of the elements of the above-described aspects of an embodiment(s) that are known or later come to be known to those of ordinary skill in the art are expressly incorporated herein by reference and are intended to be encompassed by the present claims. Any term used in the Specification and/or in the claims and expressly given a meaning in the Specification and/or claims in the present application shall have that meaning, regardless of any dictionary or other commonly used meaning for such a term. It is not intended or necessary for a device or method discussed in the Specification as any aspect of an embodiment or portion of an embodiment to address each and every problem sought to be solved by the aspects of embodiments or portions of embodiments disclosed in this application, for it to be encompassed by the present claims. No element, component, or method step in the present disclosure is intended to be dedicated to the public regardless of whether the element, component, or method step is explicitly recited in the claims. No claim element in the appended claims is to be construed under the provisions of 35 U.S.C. §112, sixth paragraph, unless the element is expressly recited using the phrase "means for" or, in the case of a method claim, the element is recited as a "step" instead of an "act".

It will be understood also be those skilled in the art that, in fulfillment of the patent statutes of the United States, Applicant(s) has disclosed at least one enabling and working embodiment of each invention recited in any respective claim appended to the Specification in the present application and perhaps in some cases only one. For purposes of cutting down on patent application length and drafting time and making the present patent application more readable to the inventor(s) and others, Applicant(s) has used from time to time or throughout the present application definitive verbs (e.g., "is", "are", "does", "has", "includes" or the like) and/or other definitive verbs (e.g., "produces," "causes" "samples," "reads," "signals" or the like) and/or gerunds (e.g., "producing," "causing", "using," "taking," "keeping," "making," "sampling," "determining," "measuring," "calculating," "reading," "signaling," or the like), in defining an aspect/feature/element of, a step of, an action of or functionality of, and/or describing any other definition of an aspect/feature/element of or step of or action/functionality of, an embodiment or portion of an embodiment of a method or apparatus which is within the subject matter being disclosed. Wherever any such definitive word or phrase or the like is used to describe an aspect/feature/element of or step of or action or functionality of or the like of any of the one or more embodiments or portions of embodiments disclosed herein, e.g., any feature, element, system, sub-system, component, sub-component, process or algorithm step, particular material, or the like, it should be read, for purposes of interpreting the scope of the claimed subject matter of what applicant(s) has invented, and claimed in the appended claims, to be preceded by one or more, or all, of the following limiting phrases, "by way of example," "for example," "as an example," "illustratively only," "by way of illustration only," etc., and/or to include any one or more, or all, of the phrases "may be," "can be", "might be," "could be" and the like. All such aspects, features, elements, steps, materials, actions, functions and the like should be considered to be described only as a possible aspect of the one or more disclosed embodiments or portions of embodiments and not as the sole possible implementation of any one or more aspects/features/elements of or steps of or actions/functionalities of, or the like of, any embodiments or portions of embodiments and/or the sole possible embodiment of the subject matter of what is claimed, even if, in fulfillment of the requirements of the patent statutes, Applicant(s) has disclosed only a single enabling example of any such aspect/feature/element of or step of or action or functionality of, or the like of, an embodiment or portion of an embodiment of the subject matter of what is claimed. Unless expressly and specifically so stated in the present application or the prosecution of this application, that Applicant(s) believes that a particular aspect/feature/element or step of or action or functionality of, or the like of, any disclosed embodiment or any particular disclosed portion of an embodiment of the subject matter of what is claimed, amounts to the one an only way to implement the subject matter of what is claimed or any aspect/feature/element or step of or action/functionality or the like of the subject matter disclosed and recited in any such claim, Applicant(s) does not intend that any description of any disclosed aspect/feature/element or step of or action or functionality or the like of, any disclosed embodiment or portion of an embodiment of the subject matter of what is disclosed and claimed in the present patent application or the entire embodiment shall be interpreted to be such one and only way to implement the subject matter of what is disclosed and claimed or any aspect/feature/element or step of or action or functionality of or the like of such subject matter, and to thus limit any claim which is broad enough to cover any such disclosed implementation along with other possible implementations of the subject matter of what is claimed, to such disclosed aspect/feature/element or step of or action/functionality of or the like of such disclosed embodiment or any portion of such embodiment or to the entirety of such disclosed embodiment. Applicant(s) specifically, expressly and unequivocally intends that any claim that has depending from it a dependent claim with any further detail of any aspect/feature/element, step, action, functionality or the like of the subject matter of what is recited in the parent claim or claims from which it directly or indirectly depends, shall be interpreted to mean that the recitation in the parent claim(s) was broad enough to cover the further detail in the dependent claim along with other possible implementations and that the further detail was not the only way to implement the aspect/feature/element claimed in any such parent claim(s), and thus that the parent claim be limited to the further detail of any such aspect/feature/element, or step, or action/functionality, or the like, recited in any such dependent claim to in any way limit the scope of the broader aspect/feature/element or step or action/functionality or the like of any such parent claim, including by incorporating the further detail of the dependent claim into the parent claim.

We claim:

1. A gas discharge laser system energy controller for controlling output pulse energy of an initial pulse in a burst of pulses, the controller comprising:
    a system calculating a filtered parameter using trigger interval as an input, the system also calculating curve fit parameters defining a relationship between the filtered parameter and discharge voltage required to maintain constant pulse energy for a plurality of prior initial burst pulses, the system using said curve fit parameters and a current filtered parameter value to calculate a discharge voltage for a next initial burst pulse.

2. A gas discharge laser system energy controller as recited in claim 1 wherein the filtered parameter is calculated with an adaptive model having one or more coefficients that are updated based upon a non-pulse energy laser parameter performance metric.

3. A gas discharge laser system energy controller as recited in claim 1 wherein the filtered parameter is calculated with an non-adaptive model.

4. A gas discharge laser system energy controller as recited in claim 1 wherein the filtered parameter is duty cycle.

5. A gas discharge laser system energy controller as recited in claim 1 wherein the filtered parameter is chosen to have a linear relationship with discharge voltage required to maintain constant pulse energy for a plurality of prior initial burst pulses.

6. A gas discharge laser system energy controller as recited in claim 1 wherein the curve fit parameters are determined using a least squares analysis.

7. A gas discharge laser system energy controller as recited in claim 1 wherein the curve fit parameters are determined using a recursive least squares analysis.

8. A gas discharge laser system energy controller as recited in claim 1 wherein the curve fit parameters are determined using a forgetting factor.

9. A gas discharge laser system energy controller as recited in claim 1 wherein the trigger intervals and discharge voltages required to maintain constant pulse energy for a plurality of prior initial burst pulses as an input used to calculate the curve fit parameters are obtained from the same laser system that the discharge voltage for a next initial burst pulse is calculated for.

10. A gas discharge laser system energy controller as recited in claim 1 wherein the trigger intervals and discharge voltages required to maintain constant pulse energy for a plurality of prior initial burst pulses as an input used to calculate the curve fit parameters are obtained from a plurality of laser systems.

11. A method for controlling output pulse energy of an initial pulse in a burst of pulses in a gas discharge laser system the method comprising the steps of:

calculating a filtered parameter using trigger interval as an input;

calculating curve fit parameters defining a relationship between the filtered parameter and discharge voltage required to maintain constant pulse energy for a plurality of prior initial burst pulses; and using said curve fit parameters and a current filtered parameter value to calculate a discharge voltage for a next initial burst pulse.

12. The method as recited in claim 11 wherein the filtered parameter is calculated with an adaptive model having one or more coefficients that are updated based upon a non-pulse energy laser parameter performance metric.

13. The method as recited in claim 11 wherein the filtered parameter is calculated with an non-adaptive model.

14. The method as recited in claim 11 wherein the filtered parameter is duty cycle.

15. The method as recited in claim 11 wherein the filtered parameter is chosen to have a linear relationship with discharge voltage required to maintain constant pulse energy for a plurality of prior initial burst pulses.

16. The method as recited in claim 11 wherein the curve fit parameters are determined using a least squares analysis.

17. The method as recited in claim 11 wherein the curve fit parameters are determined using a recursive least squares analysis.

18. The method as recited in claim 11 wherein the curve fit parameters are determined using a forgetting factor.

19. The method as recited in claim 11 wherein the trigger intervals and discharge voltages required to maintain constant pulse energy for a plurality of prior initial burst pulses as an input used to calculate the curve fit parameters are obtained from the same laser system that the discharge voltage for a next initial burst pulse is calculated for.

20. The method as recited in claim 11 wherein the trigger intervals and discharge voltages required to maintain constant pulse energy for a plurality of prior initial burst pulses as an input used to calculate the curve fit parameters are obtained from a plurality of laser systems.

* * * * *